US012250061B2

(12) United States Patent
Ma et al.

(10) Patent No.: US 12,250,061 B2
(45) Date of Patent: Mar. 11, 2025

(54) EPHEMERIS ENHANCEMENTS FOR NON-TERRESTRIAL NETWORK

(71) Applicant: QUALCOMM Incorporated, San Diego, CA (US)

(72) Inventors: Liangping Ma, San Diego, CA (US); Xiao Feng Wang, San Diego, CA (US); Ayan Sengupta, San Diego, CA (US); Bharat Shrestha, San Diego, CA (US); Umesh Phuyal, San Diego, CA (US); Peter Gaal, San Diego, CA (US); Alberto Rico Alvarino, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 17/657,906

(22) Filed: Apr. 4, 2022

(65) Prior Publication Data

US 2023/0111316 A1    Apr. 13, 2023

Related U.S. Application Data

(60) Provisional application No. 63/250,081, filed on Sep. 29, 2021.

(51) Int. Cl.
*H04W 72/20* (2023.01)
*H04B 7/185* (2006.01)

(52) U.S. Cl.
CPC ..... *H04B 7/18519* (2013.01); *H04B 7/18513* (2013.01)

(58) Field of Classification Search
CPC .......... H04W 36/00835; H04W 36/32; H04W 72/20; H04W 72/21; H04W 72/23;
(Continued)

(56) References Cited

U.S. PATENT DOCUMENTS

| 2006/0224317 A1* | 10/2006 | Sarkar ..................... G01S 19/05 |
| | | 701/469 |
| 2011/0032147 A1* | 2/2011 | Venkatraman .......... G01S 19/27 |
| | | 342/357.66 |

(Continued)

FOREIGN PATENT DOCUMENTS

WO       2021066696 A1     4/2021

OTHER PUBLICATIONS

International Search Report and Written Opinion—PCT/US2022/044372—ISA/EPO—Dec. 22, 2022.

(Continued)

*Primary Examiner* — Jean A Gelin
(74) *Attorney, Agent, or Firm* — Patterson + Sheridan, L.L.P.

(57) ABSTRACT

Certain aspects of the present disclosure provide techniques for enhancing ephemeris for non-terrestrial networks. For example, UEs of different orbit propagation capabilities (e.g., computing orbit propagation models of different accuracy levels) may receive additional ephemeris parameters. In one aspect, a network entity may determine at least one additional set of ephemeris parameters that includes different ephemeris parameters than one or more basic sets of ephemeris parameters associated with a satellite that provides a coverage for the network entity. The network entity may transmit broadcast signaling indicating the at least one additional set of ephemeris parameters. The UE may receive and use the at least one additional set of ephemeris parameters in an orbit propagation model to compute a state of motion of the satellite.

28 Claims, 11 Drawing Sheets

(58) Field of Classification Search
CPC ... H04W 72/231; H04W 72/30; H04W 84/06; H04L 5/0057; H04B 7/0626; H04B 7/18519; H04B 7/18513; H04B 7/195
USPC .......................................................... 370/329
See application file for complete search history.

(56) References Cited

U.S. PATENT DOCUMENTS

| | | | | |
|---|---|---|---|---|
| 2011/0234456 | A1* | 9/2011 | McBurney | G01S 19/27 |
| | | | | 342/357.42 |
| 2012/0046863 | A1* | 2/2012 | Hope | G01S 19/393 |
| | | | | 701/531 |
| 2018/0172837 | A1* | 6/2018 | Niemenlehto | G01S 19/258 |
| 2021/0190963 | A1* | 6/2021 | Hua | G01S 19/08 |
| 2022/0131603 | A1* | 4/2022 | Qiao | H04B 7/18534 |
| 2022/0179101 | A1* | 6/2022 | Rautalin | G01S 19/07 |
| 2023/0030149 | A1* | 2/2023 | Hou | H04W 36/00835 |
| 2023/0038675 | A1* | 2/2023 | Wang | H04W 48/10 |
| 2023/0179294 | A1* | 6/2023 | Kuang | H04B 7/2041 |
| | | | | 370/316 |
| 2023/0261738 | A1* | 8/2023 | Xu | H04W 68/02 |
| | | | | 370/316 |
| 2024/0031965 | A1* | 1/2024 | Wu | H04B 7/18519 |
| 2024/0120992 | A1* | 4/2024 | Li | H04W 36/322 |

OTHER PUBLICATIONS

Moderator (Thales): "FL Summary #1 on Enhancements on UL Time and Frequency Synchronization for NR NTN", 3GPP TSG-RAN WG1 Meeting #106-e, R1-2106781, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021 Aug. 17, 2021, XP052041770, pp. 1-76, Sections 12 and 13.

Moderator (Thales): "FL Summary on Enhancements on UL time and Frequency Synchronization for NR", P3GPP TSG-RAN WG1 Meeting #104-e, R1-2102182, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Feb. 5, 2021, XP051977744, pp. 1-86, Section 6.

* cited by examiner

EPHEMERIS ENHANCEMENTS FOR NON-TERRESTRIAL NETWORK

CROSS-REFERENCE TO RELATED APPLICATIONS

This application claims the benefit of and priority to U.S. Provisional Patent Application No. 63/250,081, filed on Sep. 29, 2021, the entire contents of which are incorporated herein by reference.

INTRODUCTION

Aspects of the present disclosure relate to wireless communications, and more particularly, to techniques for ephemeris enhancements for non-terrestrial network (NTN).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE). The method generally includes determining that the UE is or will be in an out-of-coverage state with a non-terrestrial network (NTN) for a first duration and entering a power saving state in response to the determination. The method also includes exiting the power saving state when the UE expects to be in an in-coverage state with the NTN and taking one or more actions to resume communications with the NTN.

One aspect provides a method of wireless communication by a network entity. The method generally includes determining that a UE is or will be in an out-of-coverage state with a NTN for a first duration and refraining from communicating with the UE during the first duration in response to the determination. The method also includes taking one or more actions to resume communications between the NTN and the UE.

One aspect provides an apparatus for wireless communications by a UE. The UE includes a memory; and a processor coupled to the memory. The memory and the processor are configured to: receive, from a network entity, one or more basic sets of ephemeris parameters associated with a satellite providing a coverage for the network entity; receive at least one additional set of ephemeris parameters associated with the satellite, the at least one additional set of ephemeris parameters including different ephemeris parameters than the one or more basic sets of ephemeris parameters; and use the one or more basic sets of ephemeris parameters and the at least one additional set of ephemeris parameters to calculate a state of motion of the satellite.

One aspect provides a non-transitory computer readable medium storing instructions that when executed by a UE cause the UE to: receive, from a network entity, one or more basic sets of ephemeris parameters associated with a satellite providing a coverage for the network entity; receive at least one additional set of ephemeris parameters associated with the satellite, the at least one additional set of ephemeris parameters including different ephemeris parameters than the one or more basic sets of ephemeris parameters; and use the one or more basic sets of ephemeris parameters and the at least one additional set of ephemeris parameters to calculate a state of motion of the satellite.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
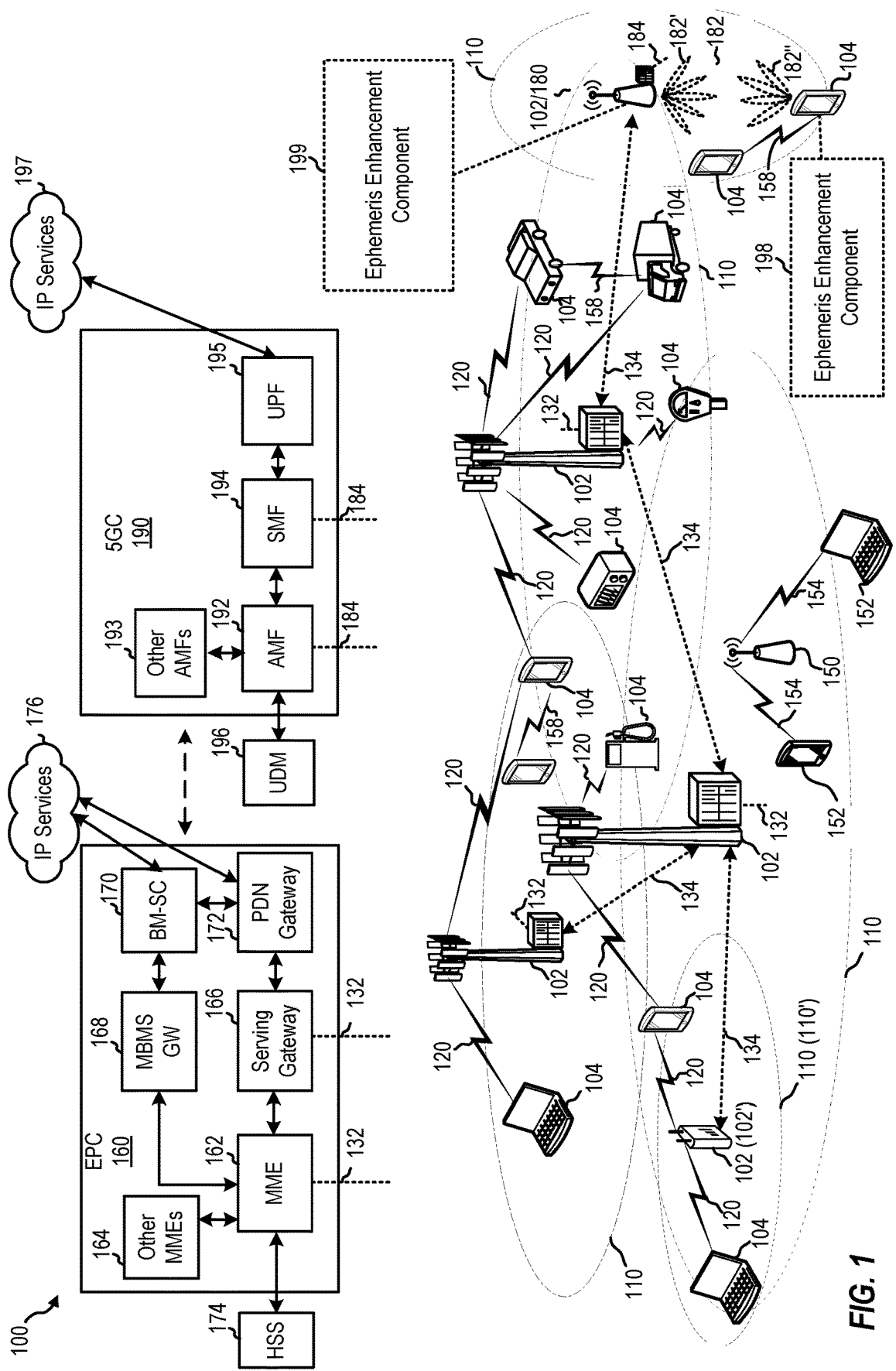
FIG. 1 is a block diagram conceptually illustrating an example wireless communication network.

Aspects of the present disclosure provide apparatuses, methods, processing systems, and non-transitory computer-readable mediums for ephemeris enhancements for a non-terrestrial network (NTN).

An NTN generally refers to a network that uses entities, such as satellites in various orbits, to provide network coverage for user equipments (UEs). As such NTNs may help provide coverage in remote regions. Unfortunately, because the NTN entities constantly move, there are coverage gaps (e.g., areas at certain times) in which the UEs may not be able to communicate with the NTN entities (e.g., because they are out of coverage or range).

To avoid such coverage gaps, the UEs may calculate the positions of the NTN entities using ephemeris, which in some aspects includes a table or set of data for providing the trajectory, position, and velocity information of the NTN entities. Additionally, the UE may use the position and/or velocity information of an NTN entity to perform timing and/or frequency pre-compensation for the uplink transmission to the NTN entity. Ideally, an ephemeris may provide an accurate orbital model of a satellite and be able to correctly predict any future positions of the satellite. Implementing such an ideal orbital model, however, would be computationally expensive and impractical for ordinary uses. As a result, different approximations and assumptions are used to simplify orbital models at the cost of accuracy. The present disclosure provides various aspects of ephemeris enhancements that allow for UEs to achieve improved accuracy in various practical scenarios.

For example, the classical Keplerian model assumes a perfectly symmetric gravitational model, by assuming that the Earth is a perfectly symmetric sphere and assuming that there is no perturbation (e.g., deviation from an ideal course due to gravitational forces by another entity). The Keplerian model uses six parameters, including: semi-major axis $\alpha$ [m], eccentricity e, argument of periapsis $\omega$ [rad], longitude of ascending node $\Omega$ [rad], inclination i [rad], and the mean anomaly M [rad] at epoch time to.

To correct the oversimplified assumptions in the Keplerian model (or other generic models), other sophisticated orbit propagation models would consider perturbations due to various factors, including the oblateness of the Earth (e.g., mass distribution not perfectly spherical, resulting in varying gravitational coefficients), aerodynamic drags (e.g., at low orbits where thin air needs be accounted for), solar radiation (e.g., pressure), and other gravitational forces (e.g., at least considering the Sun or the Moon), etc. The present disclosure enables UEs to apply sophisticated orbit propagation models that account for these factors, increasing the overall prediction accuracy. As a result, UEs employing such sophisticated models may predict the satellite positions accurately for a longer duration (e.g., error accumulates slower than less sophisticated models). The UEs may thus benefit from reducing the number of system information block (SIB) readings and saving power.

Aspects of the present disclosure provide techniques and methods for transmitting broadcast signaling indicating ephemeris parameters that serve UEs having orbit propagation models of different levels of sophistication. Some UEs, such as those hardwired with unlimited power supply, may not need sophisticated models as they may rely on frequent communications to correct modeling errors, while some UEs may employ more sophisticated orbit propagation models for the associated benefits, including power saving. The disclosed signaling mechanisms allow some UEs to receive additional ephemeris parameters for when implementing sophisticated orbit propagation models. In some cases, the signaling mechanism allows specific UEs to request for additional ephemeris parameters when implementing sophisticated orbit propagation models.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes ephemeris enhancement component 199, which may be configured to resume communications between a user equipment and a non-terrestrial network, as further described herein. Wireless network 100 further includes ephemeris enhancement component 198, which may be used configured to resume communications with a non-terrestrial network, as further described herein.

Figure 2:
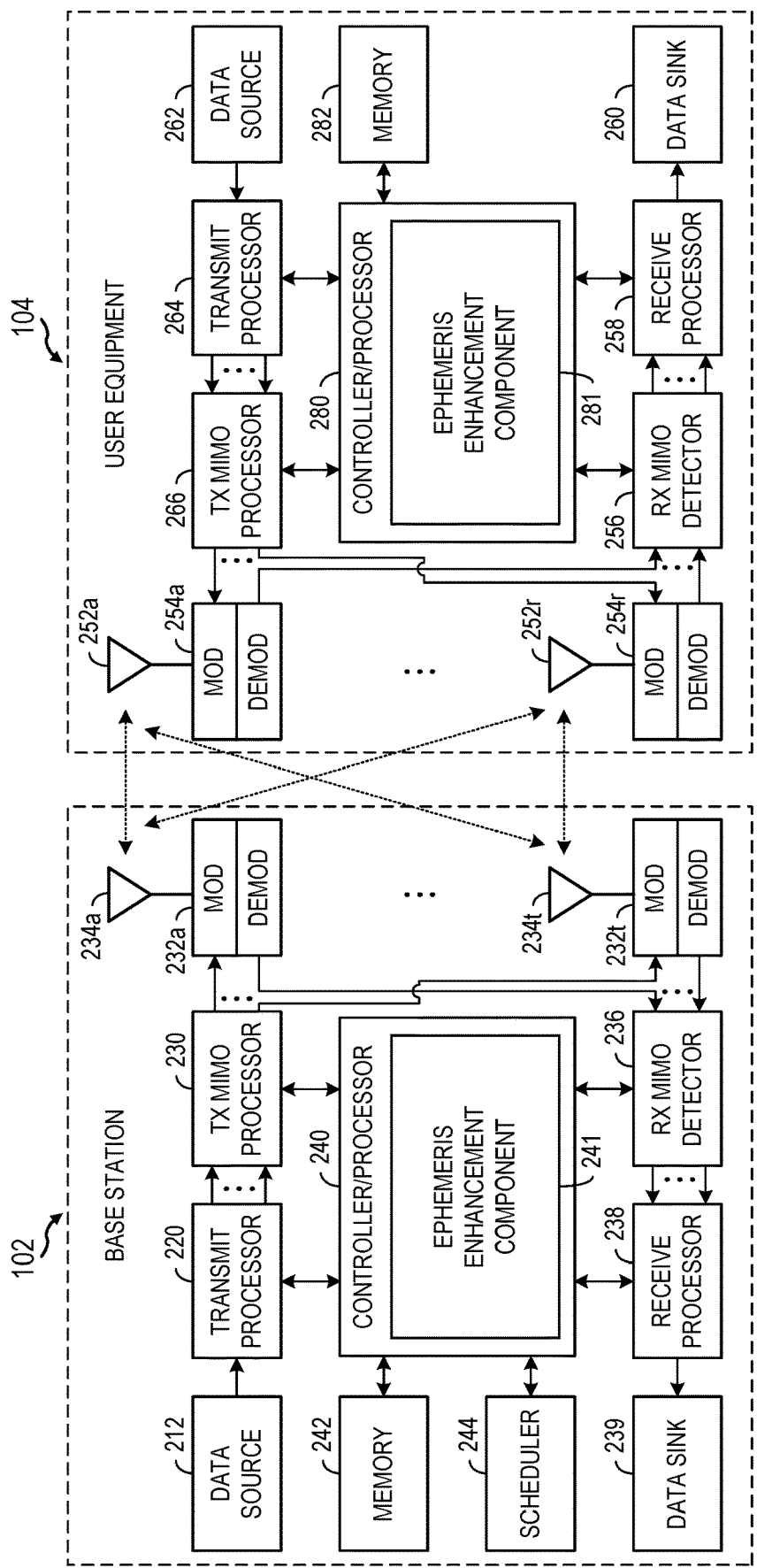
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes an ephemeris enhancement component 241, which may be representative of the ephemeris enhancement component 199 of FIG. 1. Notably, while depicted as an aspect of controller/processor 240, ephemeris enhancement component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes an ephemeris enhancement component 281, which may be representative of the ephemeris enhancement component 198 of FIG. 1. Notably, while depicted as an aspect of controller/processor 280, the ephemeris enhancement component 281 may be implemented additionally or alternatively in various other aspects of user equipment 104 in other implementations.

Figure 3:
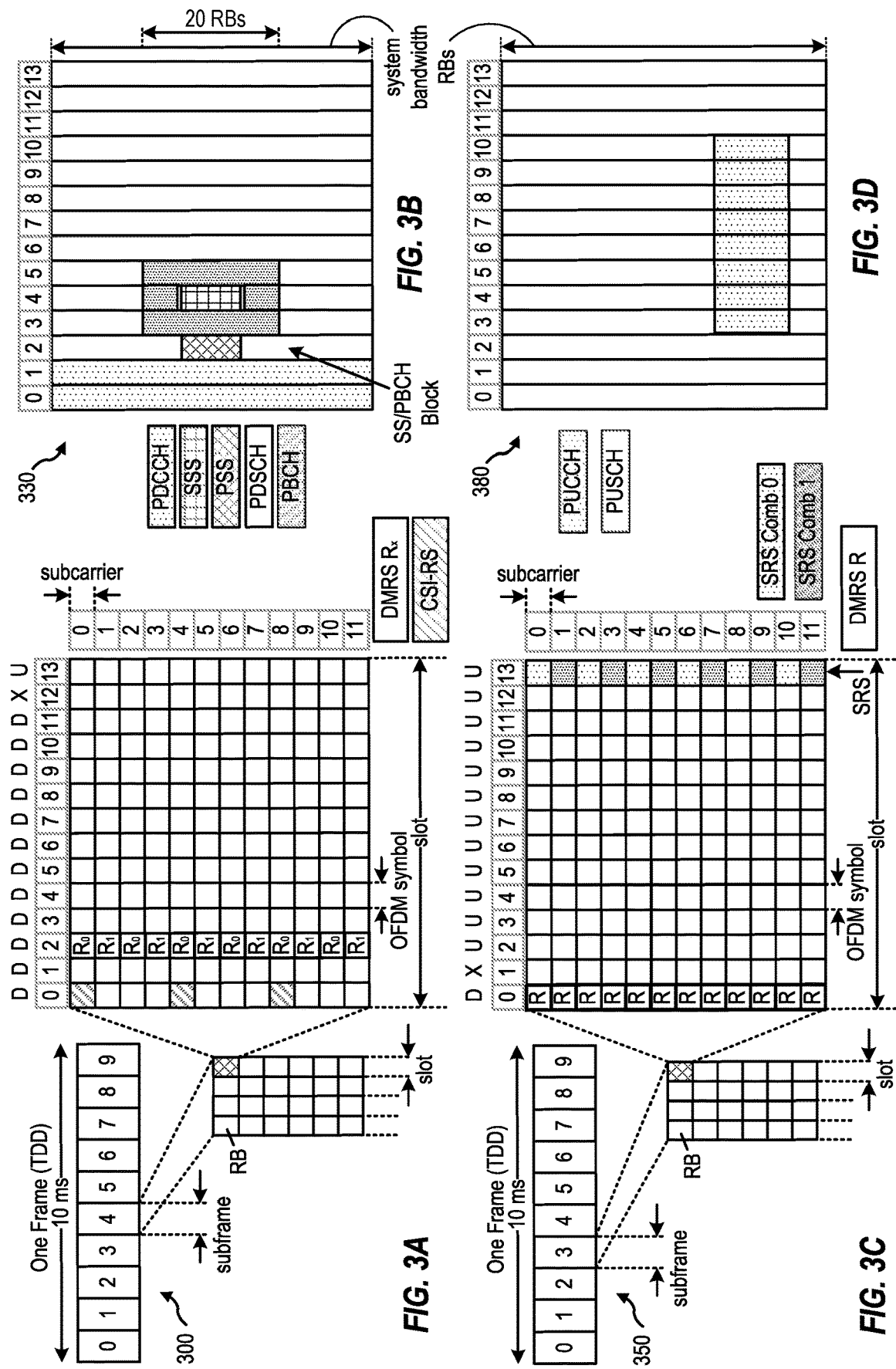
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Non-Terrestrial Network and Ephemeris

Figure 4:
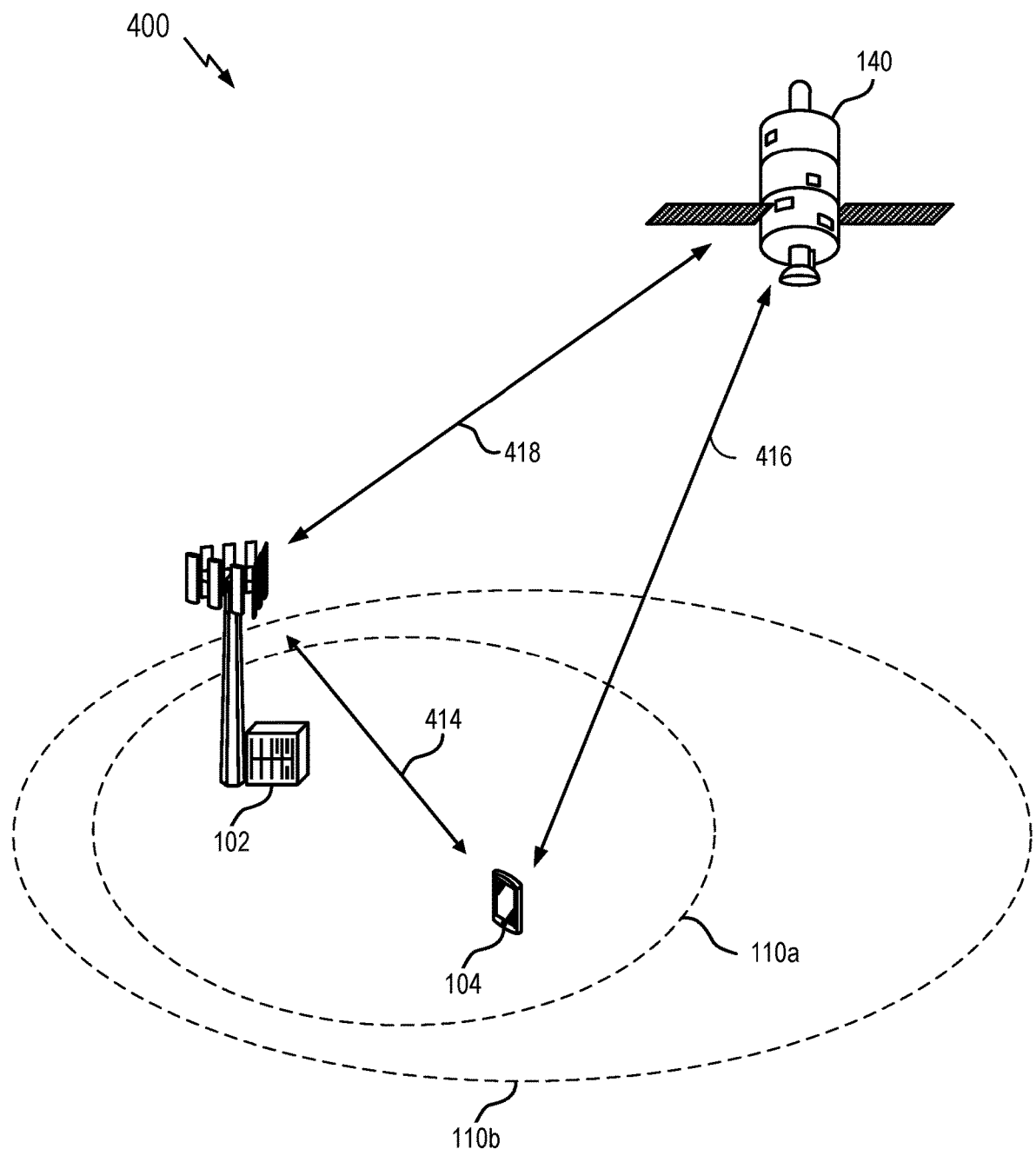
FIG. 4 is a diagram illustrating an example wireless communication network having a non-terrestrial network entity.

FIG. 4 illustrates an example of a wireless communications network 400 including a non-terrestrial network (NTN) entity 140 (which may be generally referred to as NTN 140), in which aspects of the present disclosure may be practiced. In some examples, the wireless communications network 400 may implement aspects of the wireless communication network 100. For example, the wireless communications network 400 may include BS 102, UE 104, and the non-terrestrial network entity 140, such as a satellite. BS 102 may serve a coverage area or cell 110*a* in cases of a terrestrial network, and non-terrestrial network entity 140 may serve the coverage area 110*b* in cases of a non-terrestrial network (NTN). Some NTNs may employ airborne platforms (e.g., a drone, aircraft, or balloon) and/or space-borne platforms (e.g., a satellite).

The non-terrestrial network entity 140 may communicate with the BS 102 and UE 104 as part of wireless communications in an NTN. In cases of a terrestrial network, the UE 104 may communicate with the BS 102 over a communication link 414. In the case of NTN wireless communications, the non-terrestrial network entity 140 may be a serving cell for the UE 104 via a communication link 416. In certain aspects, the non-terrestrial network entity 140 may act as a relay (or a remote radio head) for the BS 102 and the UE 104. For example, the BS 102 may communicate with the non-terrestrial network entity 140 via a communication link 418, and the non-terrestrial network entity may relay signaling between the BS 102 and UE 104 via the communication links 416 and 418.

In certain cases, an NTN may provide discontinuous radio coverage to a UE, for example, due to the orbit of NTN satellites. For example, some NTNs (such as a low Earth orbit (LEO) systems) may have one or more revisit times (which may also be known as the response time or coverage gap) in certain geographical areas. The revisit time may be the duration between consecutive viewings (or coverage areas) of a given location for an NTN. As an example, the satellite revisit time (or coverage gap) could be 10 to 40 minutes depending on the number of satellites deployed. The UE may be unreachable by the wireless network (such as the core network) during revisit time.

Figure 5:
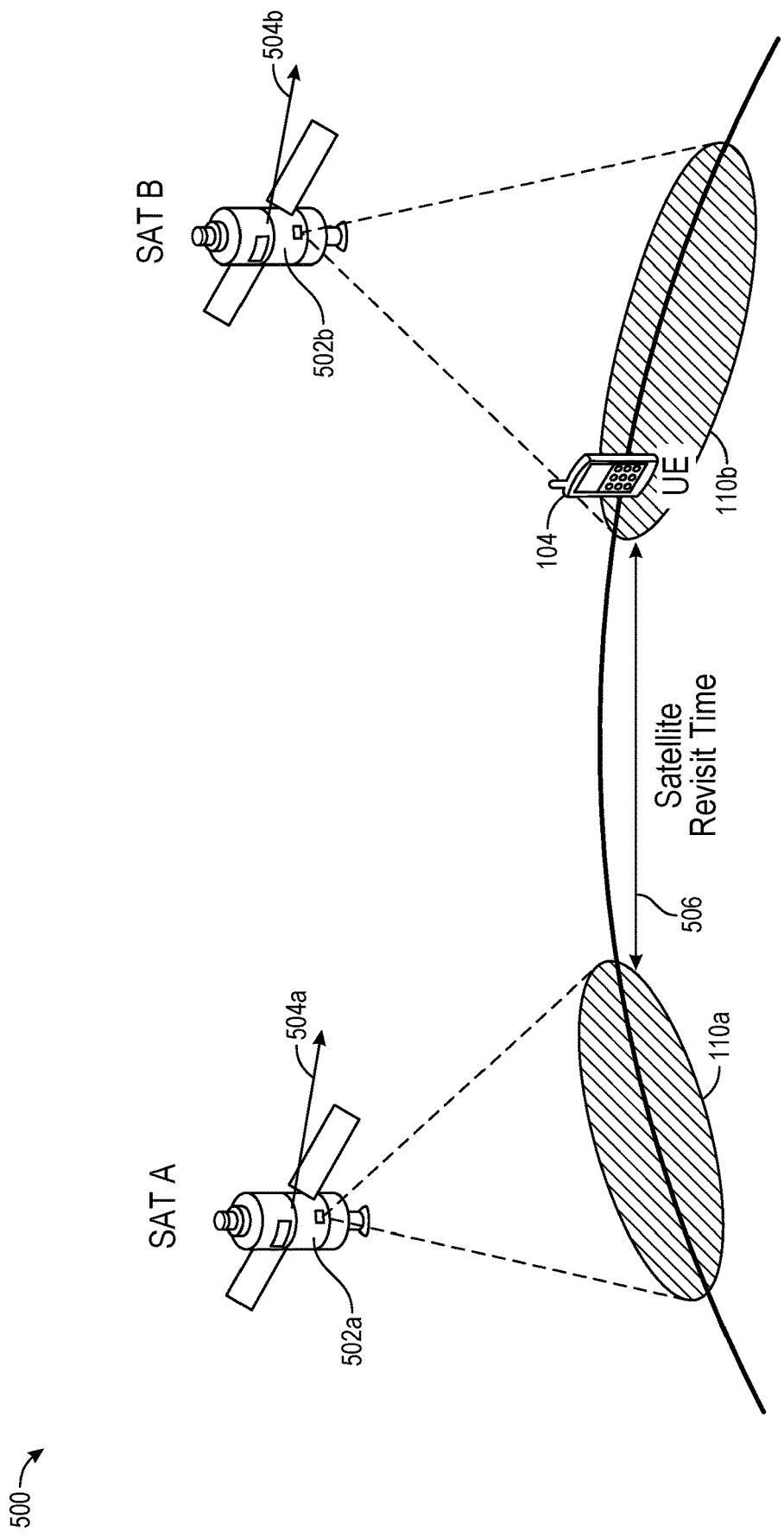
FIG. 5 is a diagram illustrating an example of discontinuous coverage of a non-terrestrial network.

FIG. 5 is a diagram illustrating an example NTN 500 having a revisit time 506 between two satellites 502*a* and 502*b*. As shown, the UE 104 may be on the edge of the coverage area 110*b* of the second satellite 502*b*. The revisit time 506 may provide a coverage gap between the coverage areas 110a and 110b of the satellites 502a and 502b. As the satellites 502a and 502b orbit generally in the respective directions 504a and 504b, the coverage areas 110a and 110b as well as the revisit time 506 pass over the UE 104, such that the UE 104 may experience discontinuous coverage with the NTN 500. When a UE (e.g., the UE 104) is in a coverage area (e.g., the coverage areas 110a or 110b) of an NTN, the UE may be considered to be in an in-coverage state with the NTN, and when the UE is in the coverage gap (e.g., the revisit time 506), the UE may be considered to be in an out-of-coverage state with the NTN for a certain duration (e.g., the revisit time).

The UE 104 may avoid attempting to communicate with the NTN 500 in the coverage gap by computing the positions of the satellites 504a and 504b. For example, the NTN 500 may broadcast serving-satellite ephemeris to allow the UE 104 to compute the trajectories of the satellites 504a and/or 504b. The ephemeris may be in different basic formats, including the PVT (position, velocity, and time) format that provides the satellite position and velocity state vectors (e.g., X, Y, Z coordinates and the first derivative thereof). The basic format may also be the Keplerian model using six parameters, including: semi-major axis α [m], eccentricity e, argument of periapsis ω [rad], longitude of ascending node Ω [rad], inclination i [rad], and mean anomaly M [rad] at epoch time to. The UE 104 may use the position and/velocity information indicated by or derived from ephemeris information to perform time and/or frequency pre-compensation for the uplink transmissions toward a satellite (e.g., satellite 504a) while the UE 104 is within the coverage of the satellite.

In addition to these basic sets of ephemeris parameters, the NTN 500 may further provide one or more additional sets of ephemeris parameters to the UE 104 to account for other factors that affect the actual trajectory of the satellites 504a and 504b, according to aspects of the present disclosure. For example, the one or more additional sets of ephemeris parameters may include at least one additional set of ephemeris parameters. In some cases, the one or more additional sets of ephemeris parameters may include a second set of ephemeris parameters or more sets of ephemeris parameters, depending on the orbit propagation model (s) available at the UE. In some cases, the one or more additional sets of ephemeris parameters may include zonal harmonics, sectoral harmonics, and tesseral harmonics to characterize the oblateness of the Earth. The one or more additional sets of ephemeris parameters may also include drag coefficient, air density measurements, and the cross-sectional area corresponding to certain orientation of the satellites to characterize the aerodynamic forces.

The one or more additional sets of ephemeris parameters may also include the cross-sectional area of the satellite with respect to the radiation direction, the mass of the satellite, and the mean right ascension of the Sun (or a source of radiation) to characterize the light pressure of solar radiation. The one or more additional sets of ephemeris parameters may further include information of other significant masses (e.g., stars, planets, satellites, comets) and the respective distances to improve the accuracy of the orbit propagation model.

In aspects of the present disclosure, the UE 104 may support different orbit propagation models of various levels of sophistication. In some cases, the UE 104 may support the secular J2 model valid for elliptical orbits (with additional J2 parameter 1.08263E-3). In some cases, the UE 104 may support the Eckstein-Hechler model for near circular orbits. The Eckstein-Hechler model may use the zonal coefficients and central attraction coefficients as the additional set of ephemeris parameters. In some cases, the UE 104 may support the Lyddane model for eccentricity below 0.9. The Lyddane model may also use the zonal coefficients. In some cases, the UE 104 may support simplified general perturbations (SGP), SGP4, and SGP8, which model an orbital period of less than 225 minutes. The UE 104 may support simplified deep space perturbations (SDP), SDP4, and SDP8, which model an orbital period of 225 minutes or more.

As the UE 104 may support various orbit propagation models, and that the NTN 500 may support two or more UEs, different sets of ephemeris parameters may be provided to the UEs. The ephemeris parameters may include a basic set shared by two or more UEs, and one or more additional sets of ephemeris parameters useful for particular UEs and corresponding to the particular orbit propagation models therein. The additional sets of ephemeris parameters may enable the UE and/or core network to determine the exact locations the NTN entities, and behave accordingly for resource and power saving purposes. Accordingly, the present disclosure provides signaling mechanisms that enhance ephemeris parameters availability to UEs that may run a wide range of orbit propagation models.

Aspects Related to Ephemeris Enhancements

Aspects of the present disclosure provide techniques and apparatus for enhancing ephemeris for non-terrestrial networks. For example, UEs of different orbit propagation capabilities (e.g., computing orbit propagation models of different accuracy levels) may receive additional ephemeris parameters.

In one aspect, a network entity may determine at least one additional set of ephemeris parameters that includes different ephemeris parameters than one or more basic sets of ephemeris parameters associated with a satellite that provides a coverage for the network entity. The network entity may transmit broadcast signaling indicating the at least one additional set of ephemeris parameters. The UE may receive and use the at least one additional set of ephemeris parameters in an orbit propagation model to compute a state of motion of the satellite.

Figure 6:
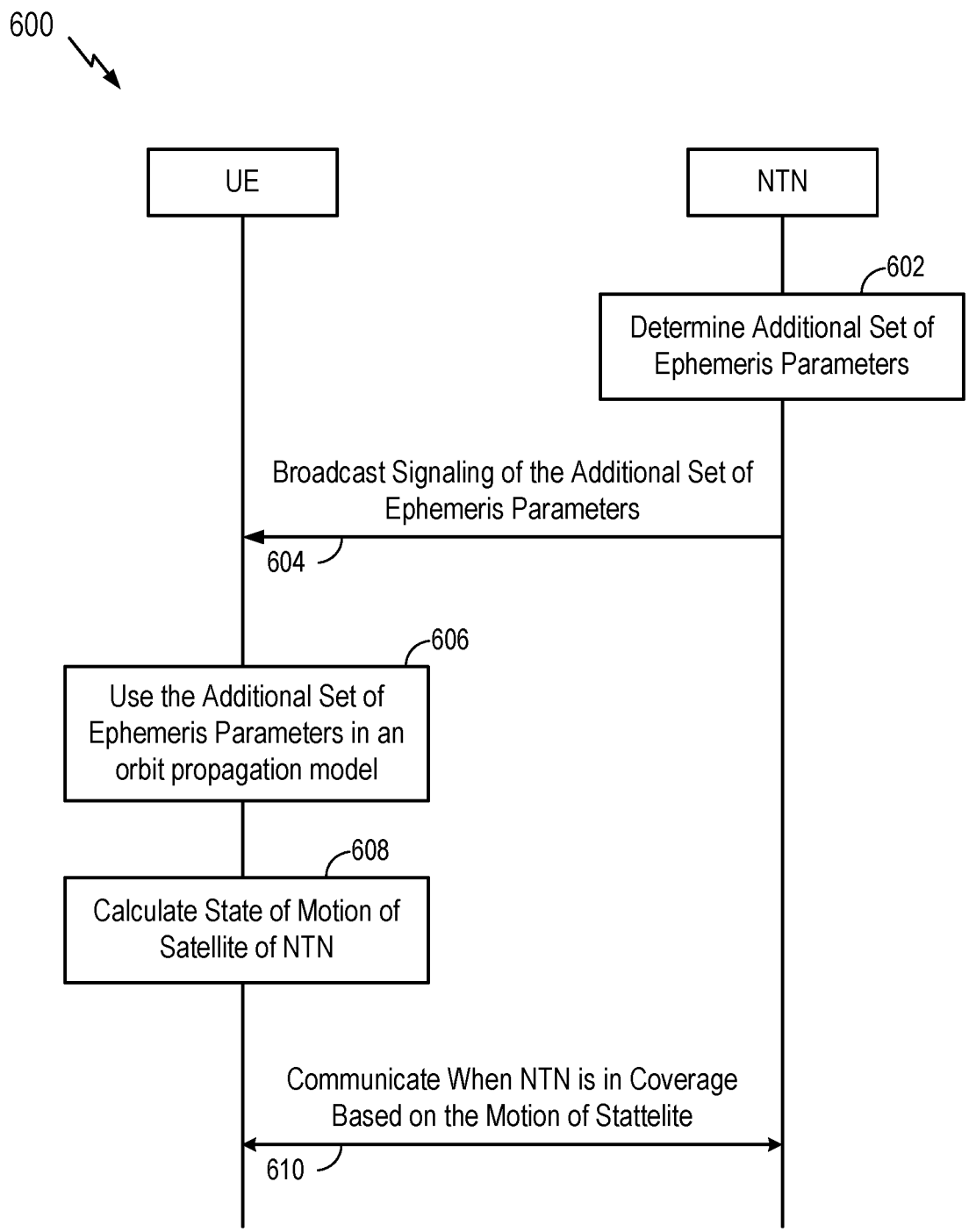
FIG. 6 is a call flow diagram illustrating example signaling for ephemeris enhancements for a non-terrestrial network, according to aspects of the present disclosure.

FIG. 6 depicts an example call flow diagram 600 for resuming communications for discontinuous coverage in an NTN. In the illustrated example, the NTN (e.g., a network entity of the NTN) may wirelessly communicate with the UE (e.g., via a Uu interface).

At 602, the NTN determines at least one additional set of ephemeris parameters that includes different ephemeris parameters than one or more basic sets of ephemeris parameters associated with a satellite providing a coverage for the NTN.

As an example, the one or more basic sets of ephemeris parameters may include a Keplerian set or a position, velocity, and time (PVT) set. The Keplerian set may include various orbital type parameters, including semi-major axis α [m], eccentricity e, argument of periapsis ω [rad], longitude of ascending node Ω [rad], inclination i [rad], and mean anomaly M [rad] at epoch time $t_o$. The PVT set may include explicit or implicit PVT type parameters. For example, the PVT set may include explicit position, velocity, and time values. In some cases, the velocity may be implicit, such as by computing the first derivative of the position parameter. For a basic set of ephemeris parameters, the NTN 140 may determine one or more additional sets of ephemeris parameters for use with the corresponding basic set.

For example, when the basic set is a Keplerian set, an additional set of ephemeris parameters (referred to as a superset herein) may include the first derivatives of the parameters in the Keplerian set. The superset may further include parameters that describe the zonal harmonics, sectorial harmonics, and tesseral harmonics. The superset may include parameters of cross-sectional area, drag coefficients, and air density for computing aerodynamic drags. The superset may include parameters for computing solar radiation pressure, including the cross-sectional area in the radiation direction, the mean right ascension of the Sun at a reference time, and the mass of the satellite (e.g., for further computing acceleration). The super set may include parameters for computing gravitational effects, such as an update or change to the satellite acceleration or a central attraction coefficient μ according to $F=\mu m/r^2$, where F is the gravitational force, r is the distance from the satellite to the Earth's center, and m is the mass of the satellite. When the basic set is a PVT set, a superset may include a second or higher order derivative of the position (e.g., the second order derivative provides acceleration parameters).

At 604, the UE receives, from the NTN, broadcast signaling indicating the at least one additional set of ephemeris parameters. The at least one additional set of ephemeris parameters and the one or more basic sets of ephemeris parameters may be associated with a reference time. In one option, a common reference time may be used for all broadcast parameters. This common reference time may be an explicit reference time (e.g., a time stamp) or an implicit reference time (e.g., indicated by the first downlink frame boundary after the transmission of the parameter at the satellite). In another option, different parameters or different sets of parameters may have respective and different reference times. In one aspect, the additional sets of the ephemeris parameters may be transmitted in a system information (SI) message that is different from the SI message carrying the basic set (or the one or more basic sets) of ephemeris parameters. The SI update rate for the additional set of ephemeris parameters may be slower than that of the SI message carrying the one or more sets of ephemeris parameters.

At 606, the UE uses the additional set of ephemeris parameters in an orbit propagation model. For example, zonal coefficients or central attraction coefficient may be used in Eckstein-Hechler model. Different sets of ephemeris parameters may be applied to different orbit propagation models, such as Lyddane model, simplified general perturbations, simplified deep space perturbations, models accounting for aerodynamic drag due to certain low altitudes, or models accounting for radiation pressure.

At 608, the UE calculates a state of motion and/or the orbital trajectory of the satellite based on the orbit propagation model. For example, the state of motion may include the position of the satellite, a relative position between the satellite and the UE, and/or a first order derivative thereof (i.e., velocity or relative velocity). Based on the calculation, the UE may accurately predict when the UE will be within the coverage of the NTN. At 610, the UE communicates with the NTN when in coverage based on the position of the satellite.

Figure 7:
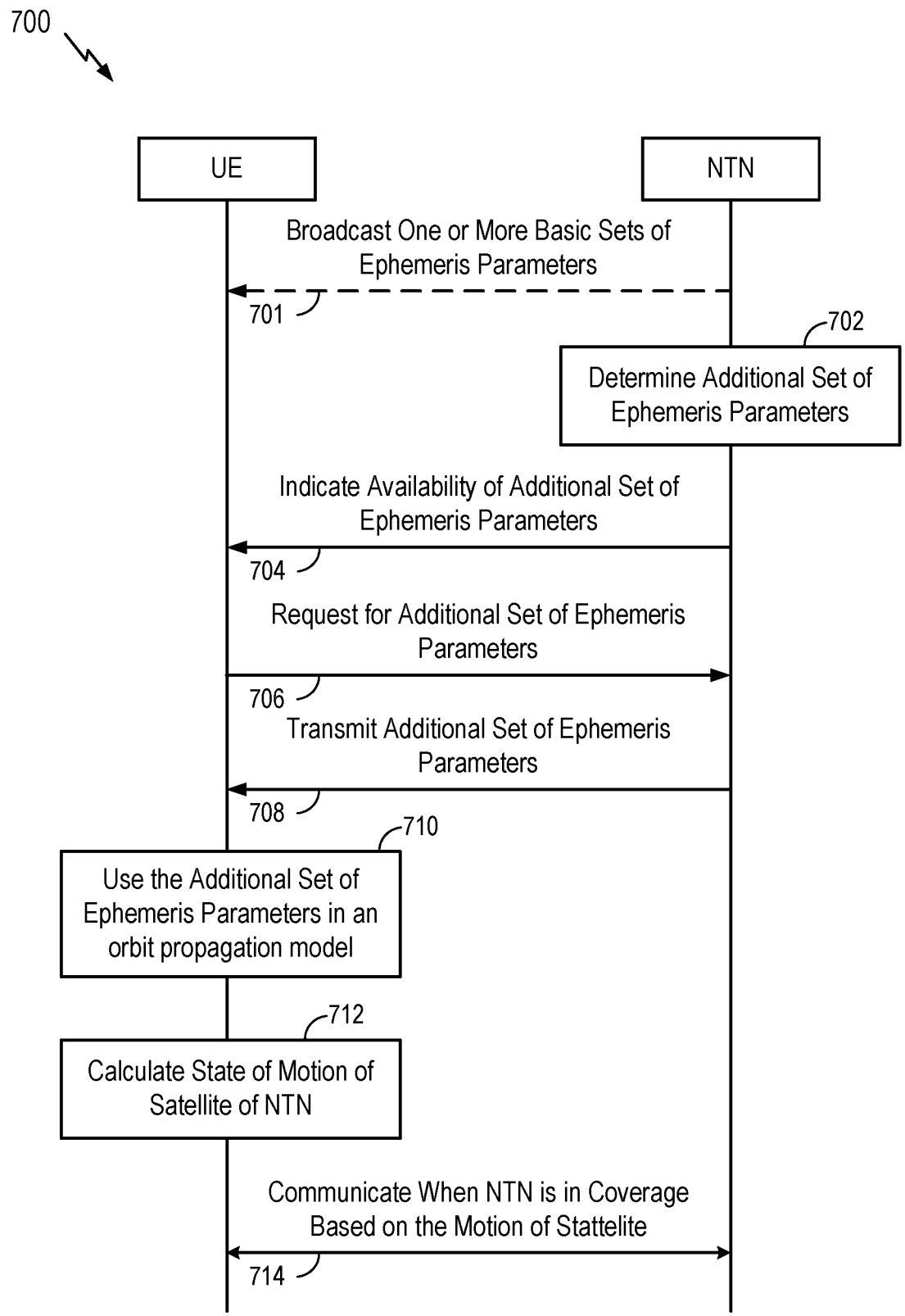
FIG. 7 is a call flow diagram illustrating example signaling for ephemeris enhancements for a non-terrestrial network, according to aspects of the present disclosure.

In some cases, the UE may request additional ephemeris parameters. FIG. 7 is a call flow diagram illustrating another example for signaling ephemeris enhancements in response to a UE request.

As shown, the NTN may, at 701, broadcast signaling of one or more basic sets of ephemeris parameters to UEs in coverage. At 702, the NTN determines one or more additional sets of ephemeris parameters. The additional sets of ephemeris parameters may include measurement data that account for correcting oversimplified assumptions, such as perturbation, aerodynamic drag, and radiation pressure. At 704, the NTN indicates the availability of the additional set of ephemeris parameters to the UE. At 706, the UE transmits a request for an additional set of ephemeris parameters. The request may be based on certain orbit propagation models in the UE. In response to the request, the NTN transmits the additional set of ephemeris parameters to the UE at 708.

In some cases, when the basic set of ephemeris parameters includes a PVT set, the additional set of ephemeris parameters may be the Keplerian set (which may not be broadcast in a SIB or, if broadcast, at a lower frequency than the PVT set). If the Keplerian set is broadcast in a SIB but at a lower frequency than the broadcast of the PVT set, a UE that is newly connected to the NTN may be forced to wait for a long time before receiving the Keplerian set without requesting it. This signaling mechanism thus enables the UE to receive the Keplerian set as the additional set of ephemeris parameters. In some cases, the additional set of ephemeris parameters may include the first order derivatives of the parameters in the Keplerian set. Other aforementioned additional sets of ephemeris parameters may also be transmitted to the UE on demand.

In some cases, the requests may include an indication of the requested parameters, system information (SI) messages, an orbit propagation model, or a class of orbit propagation models. The request may be in radio resource control (RRC) or media access control (MAC) control element (CE). The NTN may signal the requested ephemeris parameters or SI messages, as explicitly requested by the UE. The NTN may also signal the ephemeris parameters or SI messages corresponding to the orbit propagation model or the class of orbit propagation models included in the UE's request. In some cases, the signaling may indicate an associated explicit reference time (e.g., a time stamp), or an implicit reference time (e.g., the first downlink frame boundary after the transmissions of the parameter). The explicit or implicit reference times may be common for all requested parameters, or may be different among parameters or parameter sets. The signaling from the NTN to the UE may be in RRC or MAC CE.

At 710, the UE uses the received additional set of ephemeris parameters in an orbit propagation model. At 712, the UE calculates a state of motion and/or the orbital trajectory of the satellite based on the orbit propagation model. Based on the calculation, the UE may accurately predict when the UE will be within the coverage of the NTN. At 714, the UE communicates with the NTN when in coverage based on the position of the satellite.

Figure 8:
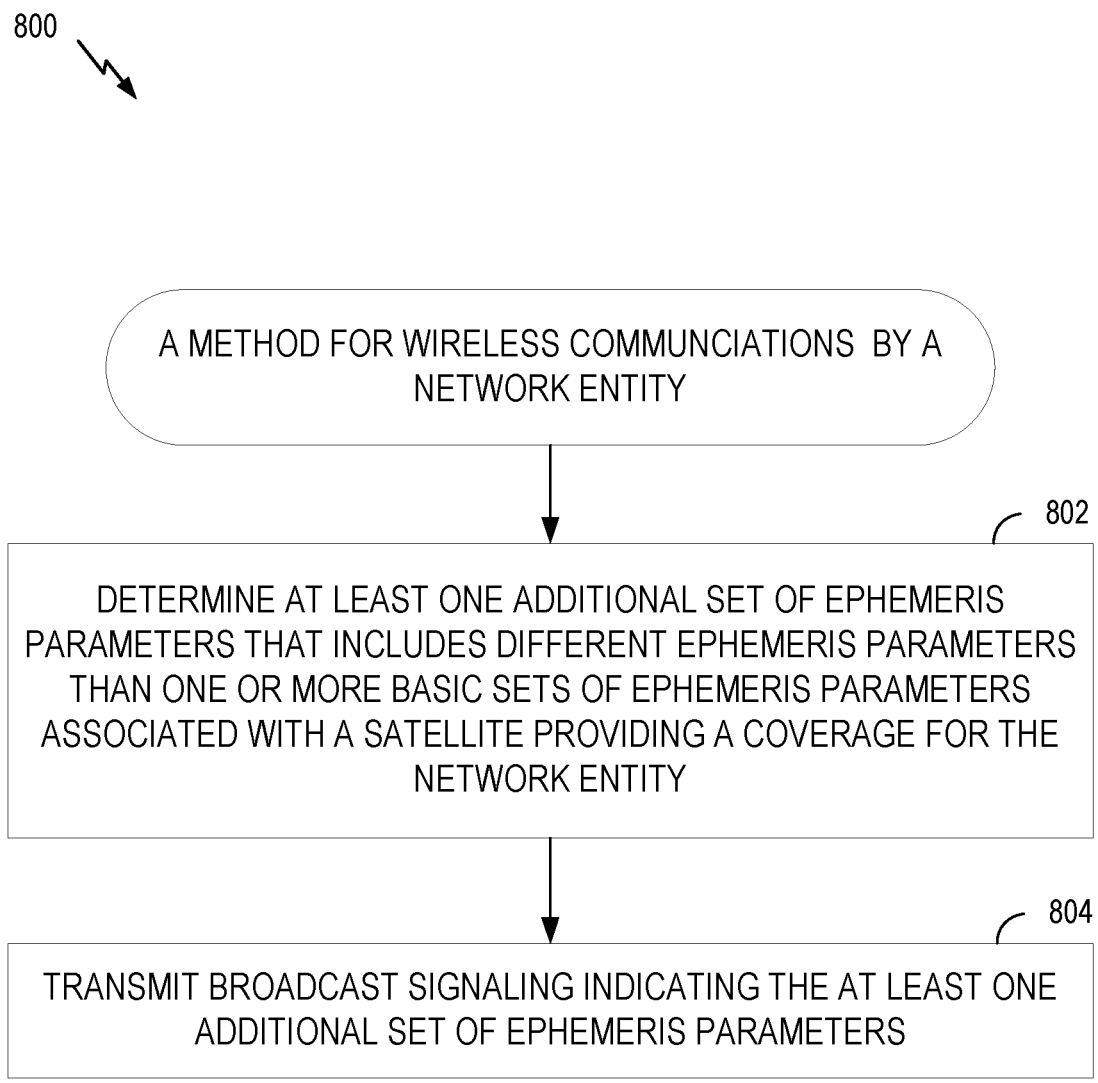
FIG. 8 is a flow diagram illustrating an example method for wireless communications by a user equipment to resume communications with a non-terrestrial network.

FIG. 8 depicts an example method 800 for ephemeris enhancements in an NTN. The method 800 may be performed by a network entity, such as the NTN 140 of FIGS. 6-7.

The method 800 begins at step 802, by determining at least one additional set of ephemeris parameters that includes different ephemeris parameters than one or more basic sets of ephemeris parameters associated with a satellite providing a coverage for the network entity.

At step 804, the network entity transmits broadcast signaling indicating the at least one additional set of ephemeris parameters.

In some aspects, the at least one additional set of ephemeris parameters is determined based on an orbit propagation model that is supported by a user equipment (UE) to receive the broadcast signaling.

In some aspects, the one or more basic sets of ephemeris parameters comprises a Keplerian set of ephemeris parameters, and the at least one additional set of ephemeris parameters comprise at least one of: a derivative of at least one of the Keplerian set of ephemeris parameters; a parameter describing at least one of zonal harmonics, sectorial harmonics, or tesseral harmonics; a parameter for computing aerodynamic drag; a parameter for computing radiation pressure; or a parameter for computing a gravitational force.

In some aspects, the one or more basic sets of ephemeris parameters comprise a position-velocity-time (PVT) set and the at least one additional set of ephemeris parameters comprises at least one of: a second order derivative of a parameter in the PVT set; or a third order derivative of the parameter in the PVT set.

In some aspects, the one or more basic sets of ephemeris parameters are used by two or more UEs, a first subset of the at least one additional set of the ephemeris parameters is used by one of the two or more UEs, and a second subset of the at least one additional set of the ephemeris parameters is used by another one of the two or more UEs.

In some aspects, the at least one additional set of ephemeris parameters and the one or more basic sets of ephemeris parameters are associated with a reference time.

In some aspects, the at least one additional set of ephemeris parameters and the one or more basic sets of ephemeris parameters share a common reference time.

In some aspects, the at least one additional set of ephemeris parameters and the one or more basic set of ephemeris parameters have different reference times.

In some aspects, the one or more basic sets and the at least one additional set of ephemeris parameters are transmitted in system information (SI) messages.

In some aspects, method 800 further includes transmitting one or more additional sets of ephemeris parameters in subsequent SI messages to update parameters in the one or more basic sets or the at least one additional set of ephemeris parameters.

In some aspects, method 800 further includes indicating, to a user equipment (UE), availability of the at least one additional set of ephemeris parameters; receiving, from the UE, a request for the at least one additional set of ephemeris parameters; and in response to the request, transmitting the at least one additional set of ephemeris parameters to the UE.

In some aspects, the at least one additional set of ephemeris parameters comprises at least one of: a derivative of one of a Keplerian set of ephemeris parameters when a basic ephemeris parameter is a position-velocity-time (PVT) parameter; a parameter describing at least one of zonal harmonics, sectorial harmonics, or tesseral harmonics; a parameter for computing aerodynamic drag; a parameter for computing radiation pressure; a parameter for computing a gravitational force; or a second or higher order derivative of a position parameter.

In some aspects, the request is in a radio resource control (RRC) or medium access control (MAC) control element (CE).

In some aspects, the request from the UE comprises at least one of: an indication of the at least one additional set of ephemeris parameters, a system information (SI) message, an orbit propagation model related to the at least one additional set of ephemeris parameters, or a class of orbit propagation models associated with the at least one additional ephemeris parameter.

In some aspects, the at least one additional set of ephemeris parameters or the SI message corresponds to the orbit propagation model or the class of orbit propagation models.

In some aspects, the at least one additional set of ephemeris parameters is transmitted to the UE in response to the request via a radio resource control (RRC) or medium access control (MAC) control element (CE).

Figure 9:
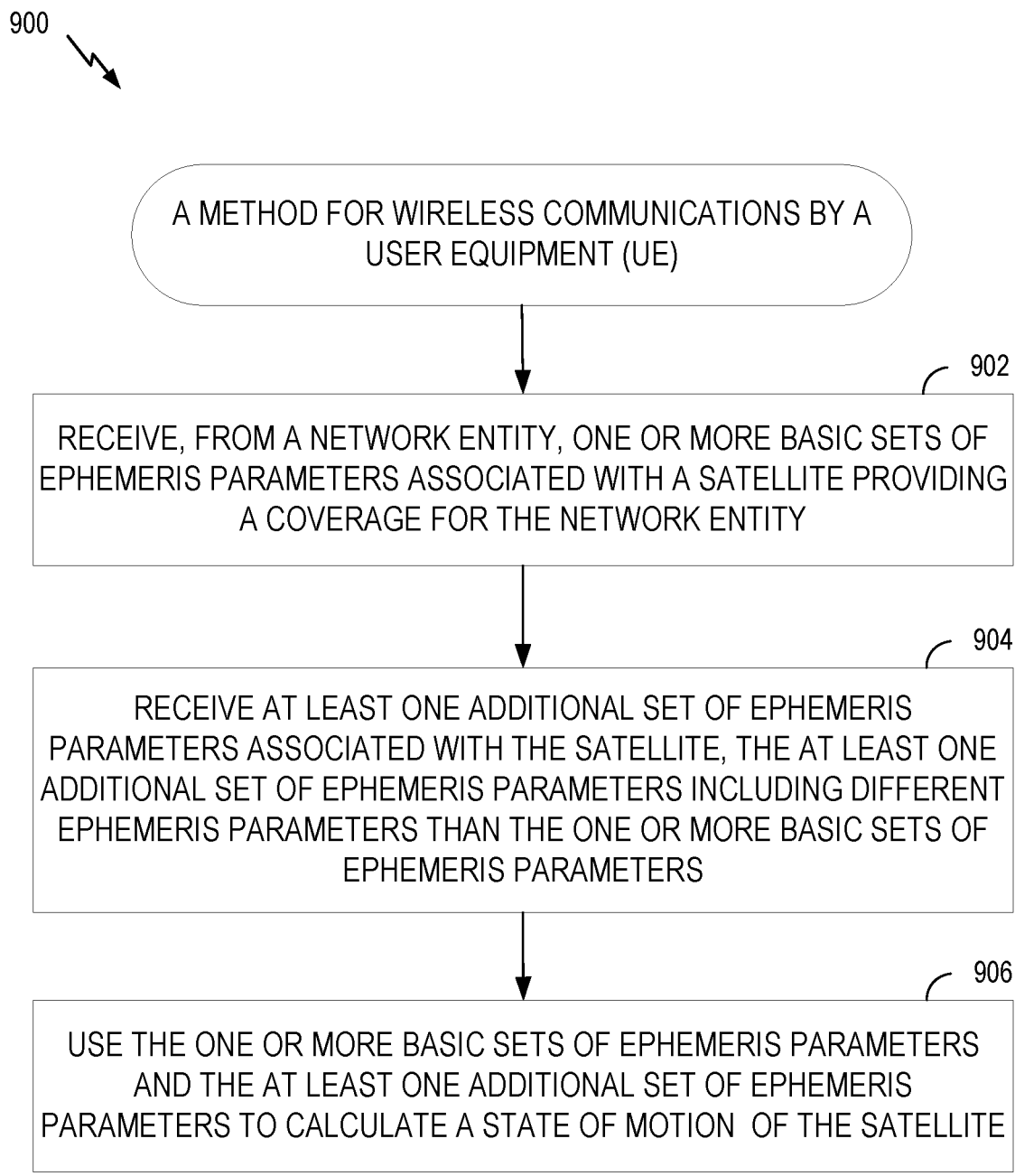
FIG. 9 is a flow diagram illustrating an example method for wireless communications by a network entity.

FIG. 9 depicts an example method 900 for ephemeris enhancements with an NTN. The method 900 may be performed by a UE, complimentary to the method 800.

The method 900 begins at step 902, by receiving, from a network entity, one or more basic sets of ephemeris parameters associated with a satellite providing a coverage for the network entity.

At 904, the UE may receive at least one additional set of ephemeris parameters associated with the satellite. The at least one additional set of ephemeris parameters includes different ephemeris parameters than the one or more basic sets of ephemeris parameters.

At 906, the UE uses the one or more basic sets of ephemeris parameters and the at least one additional set of ephemeris parameters to calculate a state of motion of the satellite.

In some aspects, method 900 further incudes using the at least one additional set of ephemeris parameters in an orbit propagation model to determine at least one of: a position of the satellite; a velocity of the satellite; a relative position of the satellite to the UE; or a relative velocity of the satellite to the UE.

In some aspects, the one or more basic sets of ephemeris parameters comprise a Keplerian set of ephemeris parameters, and the at least one additional set of ephemeris parameters comprise at least one of: a derivative of at least one of the Keplerian set of ephemeris parameters; a parameter describing at least one of zonal harmonics, sectorial harmonics, or tesseral harmonics; a parameter for computing aerodynamic drag; a parameter for computing radiation pressure; or a parameter for computing a gravitational force.

In some aspects, the one or more basic sets of ephemeris parameters comprise a position-velocity-time (PVT) set and the at least one additional set of ephemeris parameters comprises at least one of: a second order derivative of a parameter in the PVT set; or a third order derivative of the parameter in the PVT set.

In some aspects, the one or more basic sets of ephemeris parameters are applicable to another UE, the UE uses a first subset of the at least one additional set of the ephemeris parameters to calculate the state of motion of the satellite, and the other UE uses a second subset of the at least one additional set of the ephemeris parameters.

In some aspects, the at least one additional set of ephemeris parameters and the one or more basic sets of ephemeris parameters are associated with a reference time.

In some aspects, the one or more basic sets and the at least one additional set of ephemeris parameters are carried in system information (SI) messages.

In some aspects, method 900 further includes receiving one or more additional sets of ephemeris parameters in subsequent SI messages to update parameters in the one or more basic sets or the at least one additional set of ephemeris parameters.

In some aspects, method 900 further includes receiving, from the network entity, availability of the at least one additional set of ephemeris parameters; transmitting a request to the network entity for the at least one additional set of ephemeris parameters; and receiving the at least one additional set of ephemeris parameters from the network entity in response to the request.

In some aspects, the at least one additional set of ephemeris parameters comprises at least one of: a derivative of one of a Keplerian set of ephemeris parameters when a basic ephemeris parameter is a position-velocity-time (PVT) parameter; a parameter describing at least one of zonal harmonics, sectorial harmonics, or tesseral harmonics; a parameter for computing aerodynamic drag; a parameter for computing radiation pressure; a parameter for computing a gravitational force; or a second or higher order derivative of a position parameter.

In some aspects, the request is in a radio resource control (RRC) or medium access control (MAC) control element (CE).

In some aspects, the request from the UE comprises at least one of: an indication of the at least one additional set of ephemeris parameters, a system information (SI) message, an orbit propagation model related to the at least one additional set of ephemeris parameters, or a class of orbit propagation models associated with the at least one additional ephemeris parameter.

In some aspects, the at least one additional set of ephemeris parameters or the SI message corresponds to the orbit propagation model or the class of orbit propagation models.

In some aspects, the at least one additional set of ephemeris parameters is transmitted to the UE in response to the request via a radio resource control (RRC) or medium access control (MAC) control element (CE).

Example Wireless Communication Devices

Figure 10:
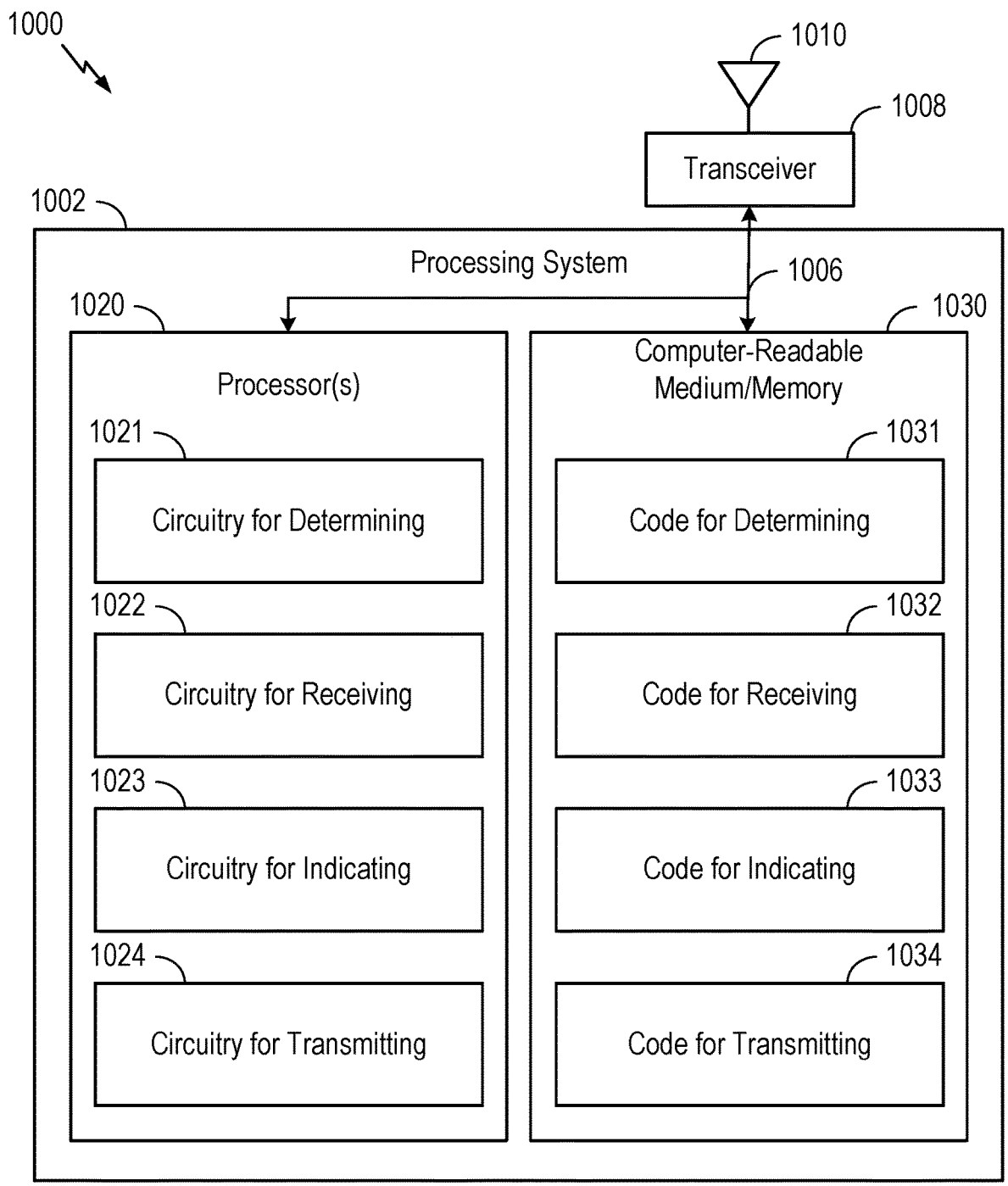
FIG. 10 depicts aspects of an example communications device.

FIG. 10 depicts an example communications device 1000 that includes various components operable, configured, or adapted to perform operations for the techniques disclosed herein, such as the operations depicted and described with respect to FIGS. 8-9. In some examples, communication device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 8-9, or other operations for performing the various techniques discussed herein for enhancing ephemeris in an NTN.

In the depicted example, computer-readable medium/memory 1030 stores code 1031 for determining, code 1032 for receiving, code 1033 for indicating, and code 1034 for transmitting.

In the depicted example, the one or more processors 1020 include circuitry configured to implement the code stored in the computer-readable medium/memory 1030, including circuitry 1021 for determining, circuitry 1022 for receiving, circuitry 1023 for indicating, and circuitry 1024 for transmitting.

Various components of communications device 1000 may provide means for performing the methods described herein, including with respect to FIGS. 8-9.

In some examples, means for transmitting or sending (or means for outputting for transmission) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving (or means for obtaining) may include the transceivers 254 and/or antenna(s) 252 of the user equipment 104 illustrated in FIG. 2 and/or transceiver 1008 and antenna 1010 of the communication device 1000 in FIG. 10.

In some examples, means for indicating or determining at least one additional set of ephemeris parameters, and/or taking action(s) may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including ephemeris enhancement component 281).

Notably, FIG. 10 is an example, and many other examples and configurations of communication device 1000 are possible.

Figure 11:
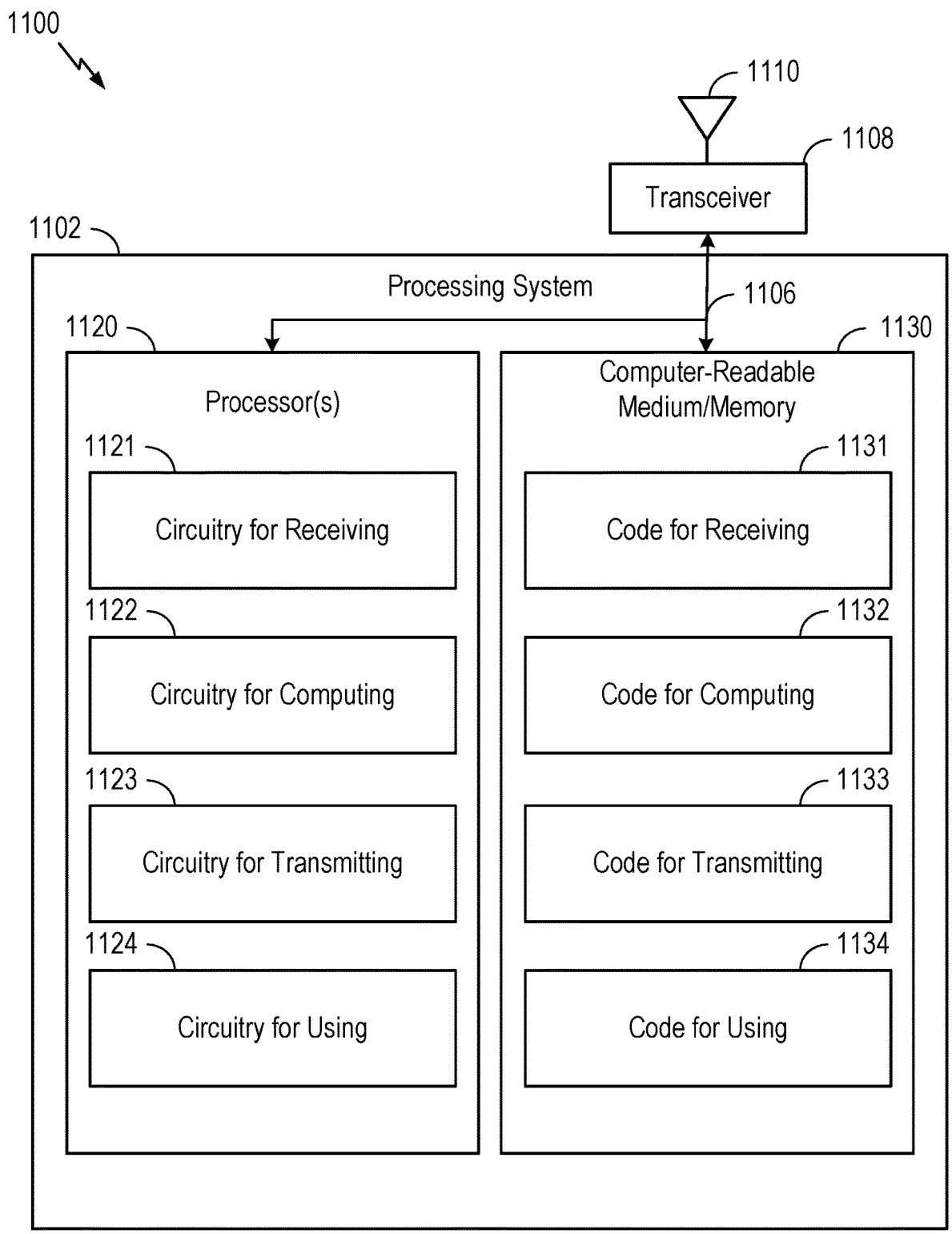
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 8-9. In some examples, communication device 1100 may be a base station 102 or non-terrestrial network entity 140 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 8-9, or other operations for performing the various techniques discussed herein for resuming communications between a UE and an NTN.

In the depicted example, computer-readable medium/memory 1130 stores code 1131 for receiving, code 1132 for computing, code 1133 for transmitting, and code 1134 for using.

In the depicted example, the one or more processors 1120 include circuitry configured to implement the code stored in the computer-readable medium/memory 1130, including circuitry 1121 for receiving, circuitry 1122 for computing, circuitry 1123 for transmitting, and circuitry 1124 for using.

Various components of communications device 1100 may provide means for performing the methods described herein, including with respect to FIGS. 8-9.

In some examples, means for transmitting or sending (or means for outputting for transmission) may include the transceivers 232 and/or antenna(s) 234 of the base station 102 illustrated in FIG. 2 and/or transceiver 1108 and antenna 1110 of the communication device 1100 in FIG. 11.

In some examples, means for receiving (or means for obtaining) may include the transceivers 232 and/or antenna (s) 234 of the base station illustrated in FIG. 2 and/or transceiver 1108 and antenna 1110 of the communication device 1100 in FIG. 11.

In some examples, means for computing, and/or using may include various processing system components, such as: the one or more processors 1120 in FIG. 11, or aspects of the base station 102 depicted in FIG. 2, including receive processor 238, transmit processor 220, TX MIMO processor 230, and/or controller/processor 240 (including ephemeris enhancement component 241).

Notably, FIG. 11 is an example, and many other examples and configurations of communication device 1100 are possible.

Example Clauses

Implementation examples are described in the following numbered clauses:

Clause 1: A method for wireless communications by a network entity, comprising: determining at least one additional set of ephemeris parameters that includes different ephemeris parameters than one or more basic sets of ephemeris parameters associated with a satellite providing a coverage for the network entity; and transmitting broadcast signaling indicating the at least one additional set of ephemeris parameters.

Clause 2: The method of Clause 1, wherein the at least one additional set of ephemeris parameters is determined based on an orbit propagation model supported a user equipment (UE) to receive the broadcast signaling.

Clause 3: The method of Clause 1 or 2, wherein the one or more basic sets of ephemeris parameters comprise a Keplerian set and the at least one additional set of ephemeris parameters comprise at least one of: a derivative of at least one of the Keplerian set of ephemeris parameters; a parameter describing at least one of zonal harmonics, sectorial harmonics, or tesseral harmonics; a parameter for computing aerodynamic drag; a parameter for computing radiation pressure; or a parameter for computing a gravitational force.

Clause 4: The method of Clause 1 or 2, wherein the one or more basic sets of ephemeris parameters comprise a position-velocity-time (PVT) set and the at least one additional set of ephemeris parameters comprises at least one of: a second order derivative of a parameter in the PVT set; or a third order derivative of the parameter in the PVT set.

Clause 5: The method of any one of Clauses 1-4, wherein the one or more basic sets of ephemeris parameters are used by two or more UEs, and wherein a first subset of the at least one additional set of the ephemeris parameters is used by one of the two or more UEs and a second, different, subset of the at least one additional set of the ephemeris parameters is used by another one of the two or more UEs.

Clause 6: The method of any one of Clauses 1-5, wherein the at least one additional set of ephemeris parameters and the one or more basic sets of ephemeris parameters are associated with a reference time.

Clause 7: The method of Clause 6, wherein the at least one of the ephemeris parameters and the one or more basic sets of ephemeris parameters share a common reference time.

Clause 8: The method of Clause 6, wherein the at least one of the ephemeris parameters and the one or more basic set of ephemeris parameters have different reference times.

Clause 9: The method of Clause 1, wherein the one or more basic sets and the at least one additional set of ephemeris parameters are transmitted in system information (SI) messages, and further comprising: transmitting one or more additional sets of ephemeris parameters in subsequent SI messages to update parameters in the one or more basic sets or the at least one additional set of ephemeris parameters.

Clause 10: The method of Clause 1, further comprising: indicating, to a user equipment (UE), availability of the at least one additional set of ephemeris parameters; receiving, from the UE, a request for the at least one additional set of ephemeris parameters; and in response to the request, transmitting the at least one additional set of ephemeris parameters to the UE.

Clause 11: The method of Clause 10, wherein the at least one additional set of ephemeris parameters comprises at least one of: a derivative of one of a Keplerian set of ephemeris parameters when a basic ephemeris parameter is a position-velocity-time (PVT) parameter; a parameter describing at least one of zonal harmonics, sectorial harmonics, or tesseral harmonics; a parameter for computing aerodynamic drag; a parameter for computing radiation pressure; a parameter for computing a gravitational force; or a second or higher order derivative of a position parameter.

Clause 12: The method of Clause 10, wherein the request is in a radio resource control (RRC) or medium access control (MAC) control element (CE).

Clause 13: The method of Clause 10, wherein the request from the UE comprises at least one of: an indication of the at least one additional set of ephemeris parameters, a system information (SI) message, an orbit propagation model related to the at least one additional set of ephemeris parameters, or a class of orbit propagation models associated with the at least one additional ephemeris parameter.

Clause 14: The method of Clause 13, wherein the at least one additional set of ephemeris parameters or the SI message corresponds to the orbit propagation model or the class of orbit propagation models.

Clause 15: The method of Clause 10, wherein the at least one additional set of ephemeris parameters is transmitted to the UE in response to the request via a radio resource control (RRC) or medium access control (MAC) control element (CE).

Clause 16: A method for wireless communications by a user equipment (UE), comprising: receiving, from a network entity, one or more basic sets of ephemeris parameters associated with a satellite providing a coverage for the network entity; receiving at least one additional set of ephemeris parameters associated with the satellite, the at least one additional set of ephemeris parameters including different ephemeris parameters than the one or more basic sets of ephemeris parameters; and using the one or more basic sets of ephemeris parameters and the at least one additional set of ephemeris parameters to calculate a state of motion of the satellite.

Clause 17: The method of Clause 16, further comprising using the at least one additional set of ephemeris parameters in an orbit propagation model to determine at least one of: a position of the satellite; a velocity of the satellite; a relative position of the satellite to the UE; or a relative velocity of the satellite to the UE.

Clause 18: The method of Clause 16 or 17, wherein the one or more basic sets of ephemeris parameters comprises a Keplerian set and the at least one additional set of ephemeris parameters comprise at least one of: a derivative of at least one of the Keplerian set of ephemeris parameters; a parameter describing at least one of zonal harmonics, sectorial harmonics, or tesseral harmonics; a parameter for computing aerodynamic drag; a parameter for computing radiation pressure; or a parameter for computing a gravitational force.

Clause 19: The method of Clause 16 or 17, wherein the one or more basic sets of ephemeris parameters comprises a position-velocity-time (PVT) set and the at least one additional set of ephemeris parameters comprises at least one of: a second order derivative of a parameter in the PVT set; or a third order derivative of the parameter in the PVT set.

Clause 20: The method of Clause 16, wherein the one or more basic sets of ephemeris parameters are applicable to another UE, and wherein the UE uses a first subset of the at least one additional set of the ephemeris parameters to calculate the state of motion of the satellite and the other UE uses a second, different, subset of the at least one additional set of the ephemeris parameters.

Clause 21: The method of Clause 16, wherein the at least one additional set of ephemeris parameters and the one or more basic sets of ephemeris parameters is associated with a reference time.

Clause 22: The method of Clause 16, wherein the one or more basic sets and the at least one additional set of ephemeris parameters are carried in system information (SI) messages, and further comprising: receiving one or more additional sets of ephemeris parameters in subsequent SI messages to update parameters in the one or more basic sets or the at least one additional set of ephemeris parameters.

Clause 23: The method of Clause 16, further comprising: receiving, from the network entity, availability of the at least one additional set of ephemeris parameters; transmitting a request to the network entity for the at least one additional set of ephemeris parameters; and receiving the at least one additional set of ephemeris parameters from the network entity in response to the request.

Clause 24: The method of Clause 23, wherein the at least one additional set of ephemeris parameters comprises at least one of: a derivative of one of a Keplerian set of ephemeris parameters when a basic ephemeris parameter is a position-velocity-time (PVT) parameter; a parameter describing at least one of zonal harmonics, sectorial harmonics, or tesseral harmonics; a parameter for computing aerodynamic drag; a parameter for computing radiation pressure; a parameter for computing a gravitational force; or a second or higher order derivative of a position parameter.

Clause 25: The method of Clause 23, wherein the request is in a radio resource control (RRC) or medium access control (MAC) control element (CE).

Clause 26: The method of Clause 23, wherein the request from the UE comprises at least one of: an indication of the at least one additional set of ephemeris parameters, a system information (SI) message, an orbit propagation model related to the at least one additional set of ephemeris parameters, or a class of orbit propagation models associated with the at least one additional ephemeris parameter.

Clause 27: The method of Clause 26, wherein the at least one additional set of ephemeris parameters or the SI message corresponds to the orbit propagation model or the class of orbit propagation models.

Clause 28: The method of Clause 23, wherein the at least one additional set of ephemeris parameters is transmitted to the UE in response to the request via a radio resource control (RRC) or medium access control (MAC) control element (CE).

Clause 29: An apparatus, comprising: a memory comprising executable instructions; one or more processors configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mm Wave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of communicating in discontinuous coverage of a non-terrestrial network in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a network entity, comprising:
one or more memories comprising instructions; and
one or more processors configured to execute the instructions and cause the apparatus to:
determine at least one additional set of ephemeris parameters that includes different ephemeris parameters than one or more basic sets of ephemeris parameters, wherein both the at least one additional set of ephemeris parameters and the one or more basic sets of ephemeris parameters are associated with a satellite providing a coverage for the network entity, and wherein the at least one additional set of ephemeris parameters comprises a parameter for computing aerodynamic drag;
indicate, to a user equipment (UE), availability of the at least one additional set of ephemeris parameters;
receive, from the UE, a request for the at least one additional set of ephemeris parameters; and
in response to the request, transmit broadcast signaling indicating the at least one additional set of ephemeris parameters to the UE.

2. The apparatus of claim 1, wherein to determine the at least one additional set of ephemeris parameters, the one or more processors are configured to execute the instructions and cause the apparatus to determine the at least one additional set of ephemeris parameters based on an orbit propagation model that is supported by the UE to receive the broadcast signaling.

3. The apparatus of claim 1, wherein the one or more basic sets of ephemeris parameters comprises a Keplerian set of ephemeris parameters, and wherein the at least one additional set of ephemeris parameters comprise at least one of:
a derivative of at least one of the Keplerian set of ephemeris parameters;
a parameter describing at least one of zonal harmonics, sectorial harmonics, or tesseral harmonics;
a parameter for computing radiation pressure; or
a parameter for computing a gravitational force.

4. The apparatus of claim 1, wherein the one or more basic sets of ephemeris parameters comprise a position-velocity-time (PVT) set and the at least one additional set of ephemeris parameters comprises at least one of:
a second order derivative of a parameter in the PVT set; or
a third order derivative of the parameter in the PVT set.

5. The apparatus of claim 1, wherein the one or more basic sets of ephemeris parameters are applicable to two or more UEs, wherein a first subset of the at least one additional set of the ephemeris parameters is applicable to one of the two or more UEs, and wherein a second subset of the at least one additional set of the ephemeris parameters is applicable to another one of the two or more UEs.

6. The apparatus of claim 1, wherein the at least one additional set of ephemeris parameters and the one or more basic sets of ephemeris parameters are associated with one or more reference times.

7. The apparatus of claim 6, wherein the at least one additional set of ephemeris parameters and the one or more basic sets of ephemeris parameters share a common reference time.

8. The apparatus of claim 6, wherein the at least one additional set of ephemeris parameters and the one or more basic set of ephemeris parameters have different reference times.

9. The apparatus of claim 1, wherein the one or more processors are configured to execute the instructions and cause the apparatus to:
transmit the one or more basic sets of ephemeris parameters and the at least one additional set of ephemeris parameters in system information (SI) messages,
transmit one or more additional sets of ephemeris parameters in subsequent SI messages to update parameters in the one or more basic sets of ephemeris parameters or the at least one additional set of ephemeris parameters.

10. The apparatus of claim 1, wherein the at least one additional set of ephemeris parameters comprises at least one of:
a derivative of one of a Keplerian set of ephemeris parameters when a basic ephemeris parameter is a position-velocity-time (PVT) parameter;
a parameter describing at least one of zonal harmonics, sectorial harmonics, or tesseral harmonics;
a parameter for computing radiation pressure;
a parameter for computing a gravitational force; or
a second or higher order derivative of a position parameter.

11. The apparatus of claim 1, wherein to receive the request, the one or more processors are configured to execute the instructions and cause the apparatus to receive the request in a radio resource control (RRC) or medium access control (MAC) control element (CE).

12. The apparatus of claim 1, wherein the request comprises at least one of:
an indication of the at least one additional set of ephemeris parameters,
a system information (SI) message,
an orbit propagation model related to the at least one additional set of ephemeris parameters, or
a class of orbit propagation models associated with the at least one additional set of ephemeris parameters.

13. The apparatus of claim 12, wherein the at least one additional set of ephemeris parameters or the SI message corresponds to the orbit propagation model or the class of orbit propagation models.

14. The apparatus of claim 1, wherein the one or more processors are configured to execute the instructions and cause the apparatus to transmit the at least one additional set of ephemeris parameters to the UE in response to the request via a radio resource control (RRC) or medium access control (MAC) control element (CE).

15. An apparatus for wireless communications at a user equipment (UE), comprising:
one or more memories comprising instructions; and
one or more processors configured to execute the instructions and cause the apparatus to:
receive, from a network entity, one or more basic sets of ephemeris parameters associated with a satellite providing a coverage for the network entity;
receive, from the network entity, availability of at least one additional set of ephemeris parameters associated with the satellite, the at least one additional set of ephemeris parameters including different ephemeris parameters than the one or more basic sets of ephemeris parameters, wherein the at least one additional set of ephemeris parameters comprises a parameter for computing aerodynamic drag;

transmit a request to the network entity for the at least one additional set of ephemeris parameters;

receive the at least one additional set of ephemeris parameters from the network entity in response to the request; and use the one or more basic sets of ephemeris parameters and the at least one additional set of ephemeris parameters to calculate a state of motion of the satellite.

16. The apparatus of claim 15, wherein the one or more processors are configured to execute the instructions and cause the apparatus to use the at least one additional set of ephemeris parameters in an orbit propagation model to determine at least one of:

a position of the satellite;
a velocity of the satellite;
a relative position of the satellite to the UE; or
a relative velocity of the satellite to the UE.

17. The apparatus of claim 15, wherein the one or more basic sets of ephemeris parameters comprise a Keplerian set of ephemeris parameters, and wherein the at least one additional set of ephemeris parameters comprise at least one of:

a derivative of at least one of the Keplerian set of ephemeris parameters;
a parameter describing at least one of zonal harmonics, sectorial harmonics, or tesseral harmonics;
a parameter for computing radiation pressure; or
a parameter for computing a gravitational force.

18. The apparatus of claim 15, wherein the one or more basic sets of ephemeris parameters comprise a position-velocity-time (PVT) set and the at least one additional set of ephemeris parameters comprises at least one of:

a second order derivative of a parameter in the PVT set; or
a third order derivative of the parameter in the PVT set.

19. The apparatus of claim 15, wherein the one or more basic sets of ephemeris parameters are applicable to another UE, wherein the one or more processors are configured to execute the instructions and cause the apparatus to use a first subset of the at least one additional set of the ephemeris parameters to calculate the state of motion of the satellite, and wherein the other UE is associated with a second subset of the at least one additional set of the ephemeris parameters.

20. The apparatus of claim 15, wherein the at least one additional set of ephemeris parameters and the one or more basic sets of ephemeris parameters are associated with one or more reference times.

21. The apparatus of claim 15, wherein the one or more processors are configured to execute the instructions and cause the apparatus to:

receive the one or more basic sets of ephemeris parameters and the at least one additional set of ephemeris parameters in system information (SI) messages,
receive one or more additional sets of ephemeris parameters in subsequent SI messages to update parameters in the one or more basic sets of ephemeris parameters or the at least one additional set of ephemeris parameters.

22. The apparatus of claim 15, wherein the at least one additional set of ephemeris parameters comprises at least one of:

a derivative of one of a Keplerian set of ephemeris parameters when a basic ephemeris parameter is a position-velocity-time (PVT) parameter;
a parameter describing at least one of zonal harmonics, sectorial harmonics, or tesseral harmonics;
a parameter for computing radiation pressure;
a parameter for computing a gravitational force; or
a second or higher order derivative of a position parameter.

23. The apparatus of claim 15, wherein to transmit the request, the one or more processors are configured to execute the instructions and cause the apparatus to transmit the request in a radio resource control (RRC) or medium access control (MAC) control element (CE).

24. The apparatus of claim 15, wherein the request comprises at least one of:

an indication of the at least one additional set of ephemeris parameters,
a system information (SI) message,
an orbit propagation model related to the at least one additional set of ephemeris parameters, or
a class of orbit propagation models associated with the at least one additional set of ephemeris parameters.

25. The apparatus of claim 24, wherein the at least one additional set of ephemeris parameters or the SI message corresponds to the orbit propagation model or the class of orbit propagation models.

26. The apparatus of claim 15, wherein the one or more processors are configured to execute the instructions and cause the apparatus to receive the at least one additional set of ephemeris parameters in response to the request via a radio resource control (RRC) or medium access control (MAC) control element (CE).

27. A method for wireless communications at a network entity, comprising:

determining at least one additional set of ephemeris parameters that includes different ephemeris parameters than one or more basic sets of ephemeris parameters, wherein both the at least one additional set of ephemeris parameters and the one or more basic sets of ephemeris parameters are associated with a satellite providing a coverage for the network entity, and wherein the at least one additional set of ephemeris parameters comprises a parameter for computing aerodynamic drag; and indicating, to a user equipment (UE), availability of the at least one additional set of ephemeris parameters;

receiving, from the UE, a request for the at least one additional set of ephemeris parameters; and in response to the request, transmitting broadcast signaling indicating the at least one additional set of ephemeris parameters to the UE.

28. A method for wireless communications at a user equipment, comprising:

receiving, from a network entity, one or more basic sets of ephemeris parameters associated with a satellite providing a coverage for the network entity;

receiving, from the network entity, availability of at least one additional set of ephemeris parameters associated with the satellite, the at least one additional set of ephemeris parameters including different ephemeris parameters than the one or more basic sets of ephemeris parameters, wherein the at least one additional set of ephemeris parameters comprises a parameter for computing aerodynamic drag;

transmitting a request to the network entity for the at least one additional set of ephemeris parameters;

receiving the at least one additional set of ephemeris parameters from the network entity in response to the request; and using the one or more basic sets of ephemeris parameters and the at least one additional set of ephemeris parameters to calculate a state of motion of the satellite.

\* \* \* \* \*